US012568098B2

(12) United States Patent
Kaciulis et al.

(10) Patent No.: US 12,568,098 B2
(45) Date of Patent: Mar. 3, 2026

(54) USE OF DYNAMICALLY MODIFIABLE RULES IN A COMPUTING AND COMMUNICATIONS SYSTEM

(71) Applicant: Netflow, UAB, Vilnius (LT)

(72) Inventors: Karolis Kaciulis, Kaisiadorys (LT); Nikodemas Zaliauskas, Vilnius (LT); Donatas Budvytis, Vilnius (LT)

(73) Assignee: Netflow, UAB, Vilnius (LT)

( * ) Notice: Subject to any disclaimer, the term of this patent is extended or adjusted under 35 U.S.C. 154(b) by 284 days.

(21) Appl. No.: 17/983,930

(22) Filed: Nov. 9, 2022

(65) Prior Publication Data

US 2024/0154980 A1     May 9, 2024

(51) Int. Cl.
    *H04L 9/40*              (2022.01)
(52) U.S. Cl.
    CPC ................................. *H04L 63/1425* (2013.01)
(58) Field of Classification Search
    CPC ............. H04L 63/0263; H04L 63/0209; H04L 63/108; H04L 63/1425; H04L 63/02; H04L 63/0227; H04L 63/029
    See application file for complete search history.

(56) References Cited

U.S. PATENT DOCUMENTS

| | | | | |
|---|---|---|---|---|
| 11,468,197 B2 * | 10/2022 | Salzman | ................. | G06F 21/45 |
| 11,647,029 B2 * | 5/2023 | Palumbo | ............. | H04L 63/1433 |
| | | | | 726/1 |

| | | | | |
|---|---|---|---|---|
| 2002/0138726 A1 * | 9/2002 | Sames | ................. | H04L 63/1416 |
| | | | | 713/166 |
| 2004/0268150 A1 * | 12/2004 | Aaron | ................. | H04L 63/0263 |
| | | | | 726/11 |
| 2009/0044263 A1 * | 2/2009 | Lingafelt | ............. | H04L 67/303 |
| | | | | 726/13 |
| 2022/0141187 A1 * | 5/2022 | Biradar | ................. | H04L 63/029 |
| | | | | 726/11 |

* cited by examiner

*Primary Examiner* — Daniel B Potratz
(74) *Attorney, Agent, or Firm* — Young Basile Hanlon & MacFarlane, P.C.

(57)                    ABSTRACT

The disclosure generally pertains to the use of a set of dynamically modifiable rules for a computing and communications system. An example method of use involves a first computing device applying a first set of dynamically modifiable rules for operating upon data. The first computing device detects a data activity that violates the first set of dynamically modifiable rules and conveys to a second computing device a request to modify the first set of dynamically modifiable rules. The second computing device may have an authority to autonomously grant permission to modify the first set of dynamically modifiable rules without human intervention. The first computing device may receive from the second computing device, an approval to modify the first set of dynamically modifiable rules, and may start applying a second set of dynamically modifiable rules that is a modified version of the first set of dynamically modifiable rules.

19 Claims, 5 Drawing Sheets

1000

USE OF DYNAMICALLY MODIFIABLE RULES IN A COMPUTING AND COMMUNICATIONS SYSTEM

BACKGROUND

Operations related to computing systems, and system features thereof, are typically directed at providing access to various types of data in a timely and easy manner. This goal, may, at times, be compromised by malicious entities who can pose security risks. It is therefore desirable to provide solutions that not only offer flexibility in terms of addressing various scenarios that may occur when computing devices operate upon data, but also provide for security when doing so.

SUMMARY

Disclosed herein are example implementations of systems and methods to use a set of dynamically modifiable rules for a computing and communications system. The set of dynamically modifiable rules is modifiable by one or more computing devices of the computing and communications system without human intervention.

An aspect of the disclosure is a method that may include applying, by a first computing device, a first set of dynamically modifiable rules for operating upon data; detecting, by the first computing device, a data activity that violates the first set of dynamically modifiable rules; and conveying, by the first computing device, to a second computing device, based on detecting the data activity, a request to modify the first set of dynamically modifiable rules.

In the aspects described herein, the method can further include receiving, by the first computing device, from the second computing device, an approval to modify the first set of dynamically modifiable rules; and applying, by the first computing device, based upon the approval received from the second computing device, a second set of dynamically modifiable rules that is a modified version of the first set of dynamically modifiable rules.

In the aspects described herein, detecting, by the first computing device, the data activity that violates the first set of dynamically modifiable rules comprises detecting malicious data received by the first computing device from a third computing device, and wherein the second set of dynamically modifiable rules may include a blacklisting of the third computing device and/or applying of an anti-malware procedure upon data received from the third computing device by the first computing device and at least a fourth computing device.

In the aspects described herein, the method can further include receiving, by a third computing device, from at least one of the first computing device or the second computing device, details associated with the second set of dynamically modifiable rules; and applying, by the third computing device, the second set of dynamically modifiable rules.

In the aspects described herein, the first computing device is assigned a first authority level and the second computing device is assigned a second authority level that is higher than the first authority level, the second authority level granting the second computing device an authority to autonomously grant permission to modify the first set of dynamically modifiable rules without human intervention.

In the aspects described herein, the first authority level is based, at least in part, on a first functionality executed by the first computing device and the second authority level is based, at least in part, on a second functionality executed by the second computing device.

In the aspects described herein, at least one of the first authority level or the second authority level is assigned by a human operator.

Another aspect of the disclosure is a method that may include receiving, by a first computing device, from a second computing device, a request to modify a first set of dynamically modifiable rules that is applicable to the second computing device for operating upon data, the request containing information about a data activity that violates the first set of dynamically modifiable rules; evaluating, by the first computing device, the request received from the second computing device; and one of modifying or retaining the first set of dynamically modifiable rules, based at least in part, on evaluating the request received from the second computing device.

In the aspects described herein, the method may further include conveying, by the first computing device, to at least the second computing device, based on the one of modifying or retaining the first set of dynamically modifiable rules, one of an approval or a denial of the request received from the second computing device.

In the aspects described herein, the one of modifying or retaining the first set of dynamically modifiable rules is further based on evaluating an authority level assigned to the second computing device.

In the aspects described herein, the one of modifying or retaining the first set of dynamically modifiable rules is further based on evaluating information received from at least a third computing device about the data activity.

In the aspects described herein, the one of modifying or retaining the first set of dynamically modifiable rules is further based on a voting procedure involving a set of computing devices that are communicatively coupled to each other via a network, the set of computing devices including the first computing device and the second computing device.

In the aspects described herein, a second set of dynamically modifiable rules that is a modified version of the first set of dynamically modifiable rules is made applicable to at least the first computing device, the second computing device, and the third computing device.

Another aspect of the disclosure is a system that includes a first computing device. The first computing device can include a first non-transitory computer-readable storage medium and a first processor that is configured to execute instructions stored in the first non-transitory computer-readable storage medium to at least receive, from a second computing device, a request to modify a first set of dynamically modifiable rules that is applicable to the first computing device for operating upon data, the request including information about a data activity that violates the first set of dynamically modifiable rules; evaluate the request received from the second computing device; and one of modify or retain the first set of dynamically modifiable rules, based at least in part, on evaluating the request received from the second computing device.

In the aspects described herein, the data activity comprises malicious data activity.

In the aspects described herein, the first computing device is assigned a first authority level and the second computing device is assigned a second authority level that is lower than the first authority level, the first authority level granting the first computing device an authority to autonomously grant permission to modify the first set of dynamically modifiable rules without human intervention.

In the aspects described herein, the second authority level assigned to the second computing device disallows autonomous modifying of the first set of dynamically modifiable rules.

In the aspects described herein, the first computing device and the second computing device are elements of a set of computing devices that are communicatively coupled to each other via a network, and wherein the first processor in the first computing device is further configured to execute instructions stored in the first non-transitory computer-readable storage medium to execute a voting procedure, the voting procedure directed at obtaining a consensus from the set of computing devices on one of modifying or retaining the first set of dynamically modifiable rules based on the information about the data activity provided by the second computing device to the first computing device; and utilize a result of the voting procedure to one of modify or retain the first set of dynamically modifiable rules In the aspects described herein, the first processor in the first computing device is further configured to execute instructions stored in the first non-transitory computer-readable storage medium to implement, as a part of the voting procedure, a hold time that is selected to permit at least a subset of the set of computing devices to submit votes to the first computing device.

In the aspects described herein, each of the subset of computing devices has an individual authority level that exceeds a threshold authority level.

BRIEF DESCRIPTION OF THE DRAWINGS

Many aspects of the invention can be better understood with reference to the following drawings. The components in the drawings are not necessarily to scale. Instead, emphasis is placed upon clearly illustrating the principles of the invention. Moreover, in the drawings, like reference numerals designate corresponding parts, or descriptively similar parts, throughout the several views and embodiments.

DETAILED DESCRIPTION

Figure 1:
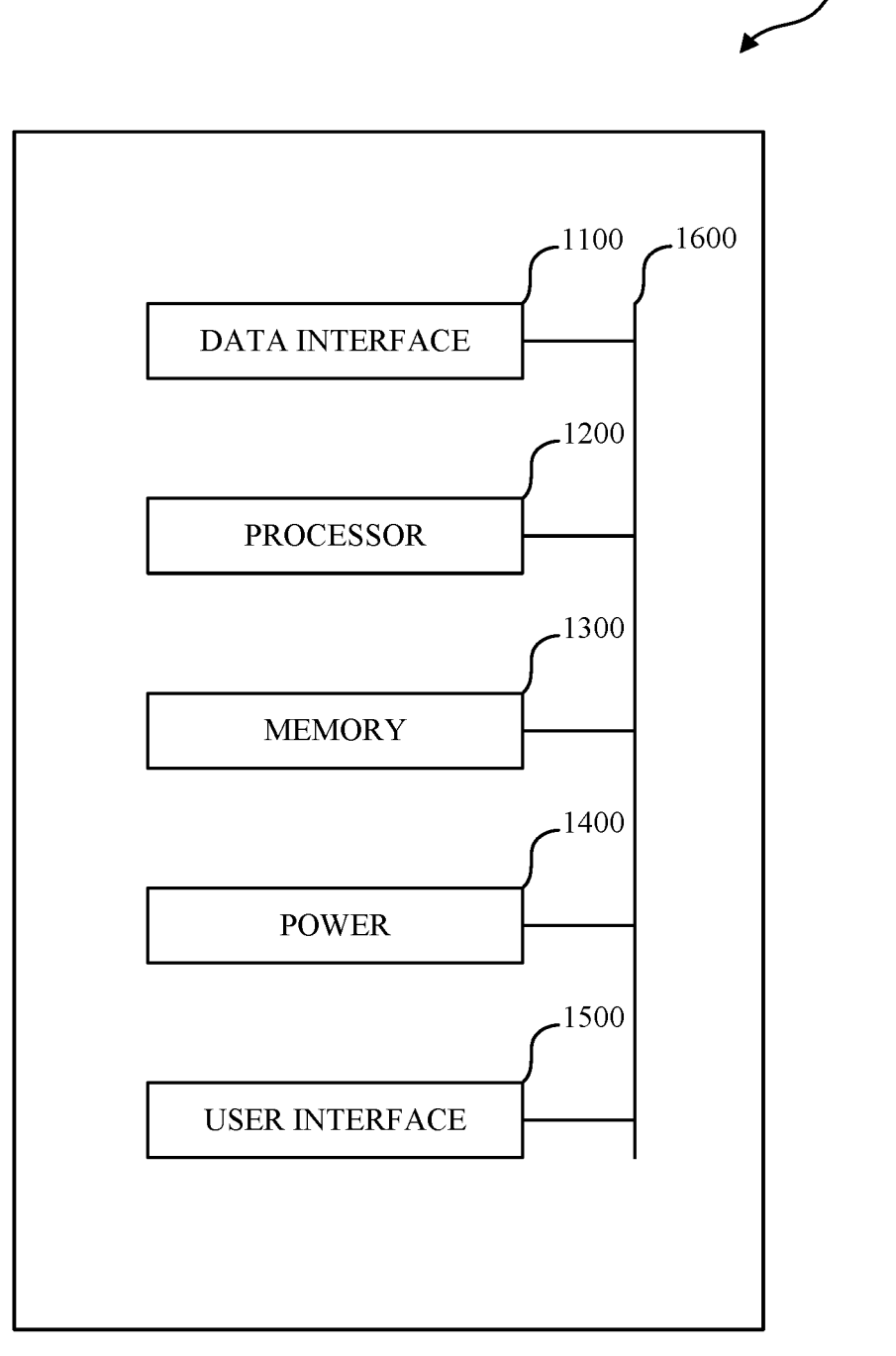
FIG. 1 is a block diagram of an example of a computing device.

A network of computing devices typically relies on each computing device abiding by a set of rules that are associated with activity such as, for example, data access, data operations, data management, and data security. Rules applicable to data access may be directed at procedures related to retrieving, modifying, copying, or moving data between various computing devices in a reliable and secure manner. Rules applicable to data operations may pertain to specific functionalities provided by various computing devices such as, for example, a routing functionality provided by a router, a switching functionality provided by a switching device, a data access functionality provided by an access device, a storage function provided by a storage device, and/or a multiplexing functionality provided by a multiplexer. Rules applicable to data management may be directed at ensuring interoperability between various computing devices based on applying, monitoring, and administering rules, policies, and regulations. The data security aspect may involve dealing with undesirable and dangerous activity such as, for example, a malware attack or a spam operation.

Existing approaches related to defining, applying, and administering rules are typically carried out by individuals such as, for example, network managers and computer users. However, such approaches can suffer from various handicaps such as the example ones described below.

An example handicap associated with a network of computing devices that uses rules defined, implemented, and administered by individuals (such as for example, a network administrator) can involve time delays and difficulties for the network administrator to obtain information about certain types of problems that may occur in some parts of a network. For example, an onset of a denial-of-service (DoS) attack or a distributed denial-of-service (DDoS) attack, may be insidious in nature and may, in certain cases, lead to a security incident that is neither foreseen nor prevented by the network administrator.

Another example handicap associated with a network of computing devices that use rules defined, implemented, and administered by individuals can involve a reduction in a quality-of-service (QoS) offered by a data handling device of a network in a manner that is not readily noticeable to a network administrator.

Yet another example handicap associated with a network of computing devices that use rules defined, implemented, and administered by individuals, can involve assigning, executing, and administering the rules upon data handling devices that are newly added to a network and/or modifying access rights assigned to one or more existing data handling devices of a network.

In view of such handicaps, the disclosure generally pertains to the use of a set of dynamically modifiable rules for a computing and communications system. The dynamically modifiable rules can be applied, enforced, and modified by the computing devices of the computing and communications system without human intervention. The rule modifications are carried out based on machine-generated actions such as, for example, detecting, by a processor of a first computing device, a data activity that violates a first set of dynamically modifiable rules, and conveying, by the processor, based on detecting the data activity, a request to a second computing device for modifying the first set of dynamically modifiable rules. A processor of the second computing device may evaluate the request and provide an approval to modify the first set of dynamically modifiable rules. Actions such as evaluating the data activity and approving the request can involve the processor of the second computing device obtaining input from other computing devices of the computing and communications system without human intervention.

FIG. 1 is a block diagram of an example of a computing device 1000. The computing device 1000 may implement, execute, or perform, one or more aspects of the methods and techniques described herein. The computing device 1000 includes a data interface 1100, a processor 1200, memory 1300, a power component 1400, a user interface 1500, and a bus 1600 (collectively, components of the computing device 1000). Although shown as a distinct unit, one or more of the components of the computing device 1000 may be integrated into respective distinct physical units. For example, the processor 1200 may be integrated in a first physical unit and the user interface 1500 may be integrated in a second physical unit. The computing device 1000 may include aspects or components not expressly shown in FIG. 1, such as an enclosure or one or more sensors.

In some implementations, the computing device 1000 is a stationary device, such as, for example, a personal computer (PC), a server, a workstation, a minicomputer, or a mainframe computer. In some implementations, the computing device 1000 is a mobile device, such as a mobile telephone, a personal digital assistant (PDA), a laptop, or a tablet computer. In other implementations, the computing device 1000 is a smart device, such as a router, a network assisted storage device (NAS), a printer, a scanner. In some aspects, the computing device 1000 may include, for example, Internet-of-Things devices such as smart home appliances, smart home security systems, autonomous vehicles, smart health monitors, smart factory equipment, wireless inventory trackers.

The data interface 1100 communicates, such as transmits, receives, or exchanges, data via one or more wired, or wireless, electronic communication mediums, such as a radio frequency (RF) communication medium, an ultraviolet (UV) communication medium, a visible light communication medium, a fiber optic communication medium, a wireline communication medium, or a combination thereof. For example, the data interface 1100 may include, or may be, a transceiver. Although not shown separately in FIG. 1, the data interface 1100 may include, or may be operatively coupled with, an antenna for wireless electronic communication. Although not shown separately in FIG. 1, the data interface 1100 may include, or may be operatively coupled with, a wired electronic communication port, such as an Ethernet port, a serial port, or another wired port, that may interface with, or may be operatively coupled to, a wired electronic communication medium. In some implementations, the data interface 1100 may be or may include a network interface card (NIC) or unit, a universal serial bus (USB), a Small Computer System Interface (SCSI), a Peripheral Component Interconnect (PCI), a near field communication (NFC) device, card, chip, or circuit, or another component for electronic data communication between the computing device 1000, or one or more of the components thereof, and one or more external electronic or computing devices. Although shown as one unit in FIG. 1, the data interface 1100 may include multiple physical components, such as a wired data interface and a wireless data interface.

For example, the computing device 1000 may electronically communicate, such as transmit, receive, or exchange computer accessible data, with one or more other computing devices via one or more wired or wireless communication links, or connections, such as via a network, using the data interface 1100, which may include using one or more electronic communication protocols, which may be network protocols, such as Ethernet, Transmission Control Protocol/Internet Protocol (TCP/IP), user datagram protocol (UDP), power line communication (PLC), infrared, ultra violet (UV), visible light, fiber optic, wire line, general packet radio service (GPRS), Global System for Mobile communications (GSM), code-division multiple access (CDMA), Long-Term Evolution (LTE), Universal Mobile Telecommunications System (UMTS), Institute of Electrical and Electronics Engineers (IEEE) standardized protocols, or other suitable protocols.

The processor 1200 is a device, a combination of devices, or a system of connected devices, capable of manipulating or processing an electronic, computer accessible, signal, or other data, such as an optical processor, a quantum processor, a molecular processor, or a combination thereof.

In some implementations, the processor 1200 is implemented as a central processing unit (CPU), such as a microprocessor. In some implementations, the processor 1200 is implemented as one or more special purpose processors, one or more graphics processing units, one or more digital signal processors, one or more microprocessors, one or more controllers, one or more microcontrollers, one or more integrated circuits, one or more Application Specific Integrated Circuits, one or more Field Programmable Gate Arrays, one or more programmable logic arrays, one or more programmable logic controllers, firmware, one or more state machines, or a combination thereof.

The processor 1200 includes one or more processing units. A processing unit may include one or more processing cores. The computing device 1000 may include multiple physical or virtual processing units (collectively, the processor 1200), which may be interconnected, such as via wired, or hardwired, connections, via wireless connections, or via a combination of wired and wireless connections. In some implementations, the processor 1200 is implemented in a distributed configuration including multiple physical devices or units that may be coupled directly or across a network. The processor 1200 includes internal memory (not expressly shown), such as a cache, a buffer, a register, or a combination thereof, for internal storage of data, such as operative data, instructions, or both. For example, the processor 1200 may read data from the memory 1300 into the internal memory (not shown) for processing.

The memory 1300 is a non-transitory computer-usable or computer-readable medium, implemented as a tangible device or component of a device. The memory 1300 contains, stores, communicates, transports, or a combination thereof, data, such as operative data, instructions, or both. For example, the memory 1300 stores an operating system of the computing device 1000, or a portion thereof. The memory 1300 contains, stores, communicates, transports, or a combination thereof, data, such as operative data, instructions, or both associated with implementing, or performing, the methods and techniques, or portions or aspects thereof, described herein. For example, the non-transitory computer-usable or computer-readable medium may be implemented as a solid-state drive, a memory card, removable media, a read-only memory (ROM), a random-access memory (RAM), any type of disk including a hard disk, a floppy disk, an optical disk, a magnetic or optical card, an application-specific integrated circuits (ASICs), or another type of non-transitory media suitable for storing electronic data, or a combination thereof. The memory 1300 may include non-volatile memory, such as a disk drive, or another form of non-volatile memory capable of persistent electronic data storage, such as in the absence of an active power supply. The memory 1300 may include, or may be implemented as, one or more physical or logical units.

The memory 1300 stores executable instructions or data, such as application data, an operating system, or a combination thereof, for access, such as read access, write access, or both, by the other components of the computing device 1000, such as by the processor 1200. The executable instructions may be organized as program modules or algorithms, functional programs, codes, code segments, or combinations thereof to perform one or more aspects, features, or elements of the methods and techniques described herein. The application data may include, for example, user files, database catalogs, configuration information, or a combination thereof. The operating system may be, for example, a desktop or laptop operating system; an operating system for a mobile device, such as a smartphone or tablet device; or an operating system for a large device, such as a mainframe computer. For example, the memory 1300 may be implemented as, or may include, one or more dynamic random-access memory (DRAM) modules, such as a Double Data Rate Synchronous Dynamic Random-Access Memory module, Phase-Change Memory (PCM), flash memory, or a solid-state drive.

The power component 1400 obtains, stores, or both, power, or energy, used by the components of the computing device 1000 to operate. The power component 1400 may be implemented as a general-purpose alternating-current (AC) electric power supply, or as a power supply interface, such as an interface to a household power source or other external power distribution system. In some implementations, the power component 1400 may be implemented as a single use battery or a rechargeable battery such that the computing device 1000 operates, or partially operates, independently of an external power distribution system. For example, the power component 1400 may include a wired power source; one or more dry cell batteries, such as nickel-cadmium (NiCad), nickel-zinc (NiZn), nickel metal hydride (NiMH), lithium-ion (Li-ion); solar cells; fuel cells; or any other device, or combination of devices, capable of powering the computing device 1000.

The user interface 1500 includes one or more units or devices for interfacing with an operator of the computing device 1000, such as a human user. In some implementations, the user interface 1500 obtains, receives, captures, detects, or otherwise accesses, data representing user input to the computing device, such as via physical interaction with the computing device 1000. In some implementations, the user interface 1500 outputs, presents, displays, or otherwise makes available, information, such as to an operator of the computing device 1000, such as a human user The user interface 1500 may be implemented as, or may include, a virtual or physical keypad, a touchpad, a display, such as a liquid crystal display (LCD), a cathode-ray tube (CRT), a light emitting diode (LED) display, an organic light emitting diode (OLED) display, an active-matrix organic light emitting diode (AMOLED), a touch display, a speaker, a microphone, a video camera, a sensor, a printer, or any combination thereof. In some implementations, a physical user interface 1500 may be omitted, or absent, from the computing device 1000.

The bus 1600 distributes or transports data, power, or both among the components of the computing device 1000 such that the components of the computing device are operatively connected. Although the bus 1600 is shown as one component in FIG. 1, the computing device 1000 may include multiple busses, which may be connected, such as via bridges, controllers, or adapters. For example, the bus 1600 may be implemented as, or may include, a data bus and a power bus. The execution, or performance, of instructions, programs, code, applications, or the like, so as to perform the methods and techniques described herein, or aspects or portions thereof, may include controlling, such as by sending electronic signals to, receiving electronic signals from, or both, the other components of the computing device 1000.

Although not shown separately in FIG. 1, data interface 1100, the power component 1400, or the user interface 1500 may include internal memory, such as an internal buffer or register.

Although an example of a configuration of the computing device 1000 is shown in FIG. 1, other configurations may be used. One or more of the components of the computing device 1000 shown in FIG. 1 may be omitted, or absent, from the computing device 1000 or may be combined or integrated. For example, the memory 1300, or a portion thereof, and the processor 1200 may be combined, such as by using a system on a chip design.

Figure 2:
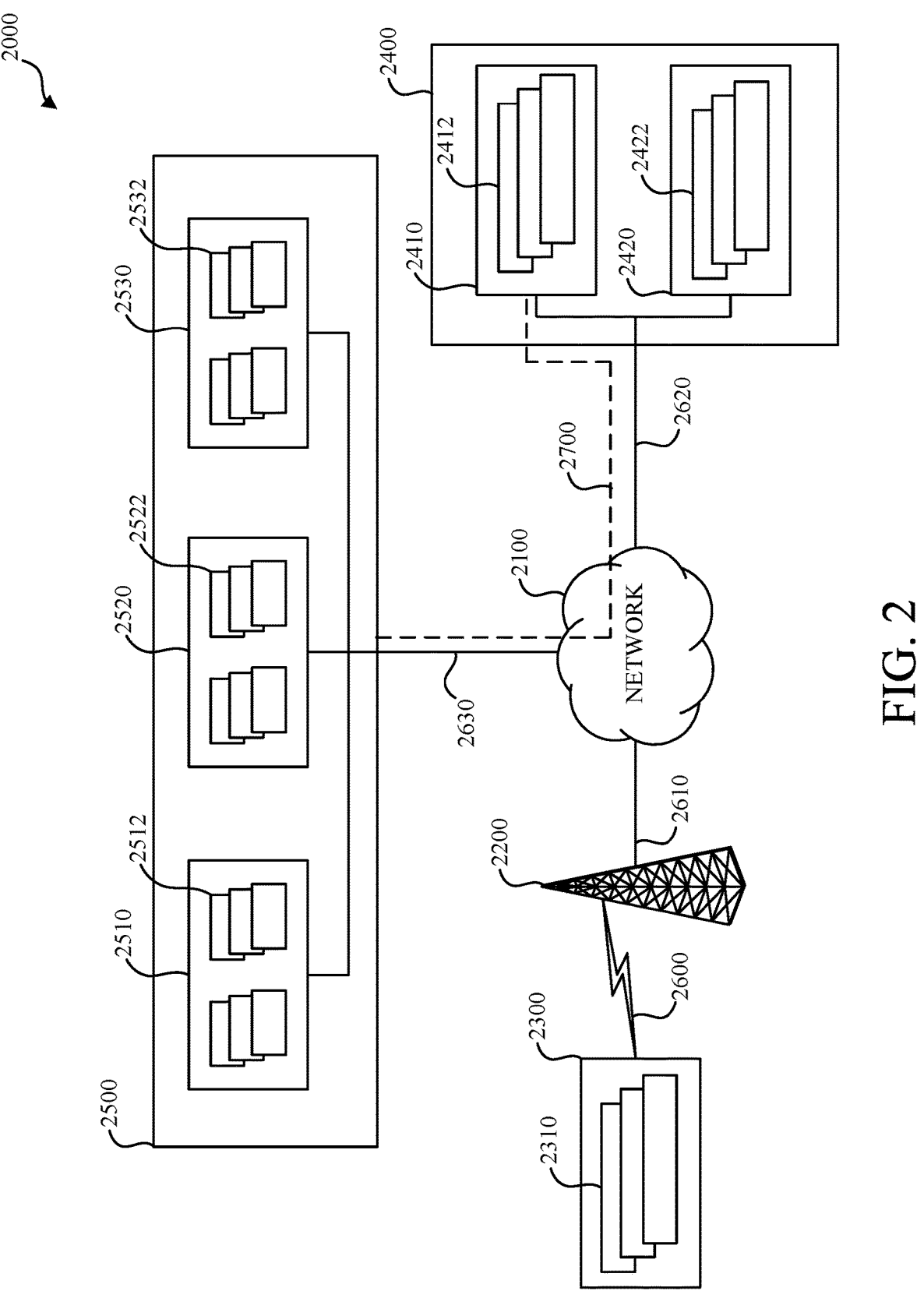
FIG. 2 is a block diagram of an example of a computing and communications system.

FIG. 2 is a diagram of a computing and communications system 2000. The computing and communications system 2000 includes a first network 2100, an access point 2200, a first computing and communications device 2300, a second network 2400, and a third network 2500. The second network 2400 includes a second computing and communications device 2410 and a third computing and communications device 2420. The third network 2500 includes a fourth computing and communications device 2510, a fifth computing and communications device 2520, and a sixth computing and communications device 2530. Other configurations, including fewer or more computing and communications devices, fewer or more networks, and fewer or more access points, may be used.

One or more of the networks 2100, 2400, 2500 may be, or may include, a local area network (LAN), wide area network (WAN), virtual private network (VPN), a mobile or cellular telephone network, the Internet, or any other means of electronic communication. The networks 2100, 2400, 2500 respectively transmit, receive, convey, carry, or exchange wired or wireless electronic communications using one or more communications protocols, or combinations of communications protocols, the transmission control protocol (TCP), the user datagram protocol (UDP), the internet protocol (IP), the real-time transport protocol (RTP), the HyperText Transport Protocol (HTTP), or a combination thereof. For example, a respective network 2100, 2400, 2500, or respective portions thereof, may be, or may include a circuit-switched network, or a packet-switched network wherein the protocol is a packet-based protocol. A packet is a data structure, such as a data structure that includes a header, which may contain control data or 'meta' data describing the packet, and a body, or payload, which may contain the substantive data conveyed by the packet.

The access point 2200 may be implemented as, or may include, a base station, a base transceiver station (BTS), a Node-B, an enhanced Node-B (eNode-B), a Home Node-B (HNode-B), a wireless router, a wired router, a hub, a relay, a switch, a bridge, or any similar wired or wireless device. Although the access point 2200 is shown as a single unit, an access point can include any number of interconnected elements. Although one access point 2200 is shown, fewer or more access points may be used. The access point 2200 may communicate with other communicating devices via wired or wireless electronic communications links or via a sequence of such links.

As shown, the access point 2200 communicates via a first communications link 2600 with the first computing and communications device 2300. Although the first communications link 2600 is shown as wireless, the first communications link 2600 may be implemented as, or may include, one or more wired or wireless electronic communications links or a sequence of such links, which may include parallel communications links for multipath communications.

As shown, the access point 2200 communicates via a second communications link 2610 with the first network 2100. Although the second communications link 2610 is shown as wired, the second communications link 2610 may be implemented as, or may include, one or more wired or wireless electronic communications links or a sequence of such links, which may include parallel communications links for multipath communications.

As shown, the first network 2100 communicates with the second network 2400 via a third communications link 2620. Although the third communications link 2620 is shown as wired, the third communications link 2620 may be implemented as, or may include, one or more wired or wireless electronic communications links or a sequence of such links, which may include parallel communications links for multipath communications.

As shown, the first network 2100 communicates with the third network 2500 via a fourth communications link 2630. Although the fourth communications link 2630 is shown as wired, the fourth communications link 2630 may be implemented as, or may include, one or more wired or wireless electronic communications links or a sequence of such links, which may include parallel communications links for multipath communications.

The computing and communications devices 2300, 2410, 2420, 2510, 2520, 2530 are, respectively, computing devices, such as the computing device 1000 shown in FIG. 1. For example, the first computing and communications device 2300 may be a user device, such as a mobile computing device or a smartphone, the second computing and communications device 2410 may be a user device, such as a laptop, the third computing and communications device 2420 may be a user device, such as a desktop, the fourth computing and communications device 2510 may be a server, such as a database server, the fifth computing and communications device 2520 may be a server, such as a cluster or a mainframe, and the sixth computing and communications device 2530 may be a server, such as a web server.

The computing and communications devices 2300, 2410, 2420, 2510, 2520, 2530 communicate, or exchange data, such as voice communications, audio communications, data communications, video communications, messaging communications, broadcast communications, or a combination thereof, with one or more of the other computing and communications devices 2300, 2410, 2420, 2510, 2520, 2530 respectively using one or more of the networks 2100, 2400, 2500, which may include communicating using the access point 2200, via one or more of the communication links 2600, 2610, 2620, 2630.

For example, the first computing and communications device 2300 may communicate with the second computing and communications device 2410, the third computing and communications device 2420, or both, via the first communications link 2600, the access point 2200, the second communications link 2610, the network 2100, the third communications link 2620, and the second network 2400. The first computing and communications device 2300 may communicate with one or more of the third computing and communications device 2510, the fourth computing and communications device 2520, the fifth computing and communications device 2520, via the first communications link 2600, the access point 2200, the second communications link 2610, the network 2100, the fourth communications link 2630, and the third network 2500.

For simplicity and clarity, communications hardware such as, for example, transmission lines, and any additional elements such as, for example, data encoders, data decoders, and data formatters, that enable data transfers between a sending communicating device and a receiving communicating device may be generally referred to herein as a communications link. For example, the first computing and communications device 2300 may send data to the second computing and communications device 2410 via a first communications link, or via a combination of communications links including the first communications link, and the second computing and communications device 2410 may send data to the first computing and communications device 2300 via the first communications link, via a second communications link, or via a combination of communications links, which may include the first communications link.

The first computing and communications device 2300 includes, such as executes, performs, or operates, one or more applications, or services, 2310. The second computing and communications device 2410 includes, such as executes, performs, or operates, one or more applications, or services, 2412. The third computing and communications device 2420 includes, such as executes, performs, or operates, one or more applications, or services, 2422. The fourth computing and communications device 2510 includes, such as stores, hosts, executes, performs, or operates, one or more documents, applications, or services, 2512. The fifth computing and communications device 2520 includes, such as stores, hosts, executes, performs, or operates, one or more documents, applications, or services, 2522. The sixth computing and communications device 2530 includes, such as stores, hosts, executes, performs, or operates, one or more documents, applications, or services, 2532.

In some implementations, one or more of the computing and communications devices 2300, 2410, 2420, 2510, 2520, 2530 may communicate with one or more other computing and communications devices 2300, 2410, 2420, 2510, 2520, 2530, or with one or more of the networks 2400, 2500, via a virtual private network (VPN). For example, the second computing and communications device 2410 is shown as communicating with the third network 2500, and therefore with one or more of the computing and communications devices 2510, 2520, 2530 in the third network 2500, via a virtual private network 2700, which is shown using a broken line to indicate that the virtual private network 2700 uses the first network 2100, the third communications link 2620, and the fourth communications link 2630.

In some implementations, two or more of the computing and communications devices 2300, 2410, 2420, 2510, 2520, 2530 may be in a distributed, or clustered, configuration. For example, the third computing and communications device 2510, the fourth computing and communications device 2520, and the fifth computing and communications device 2520 may, respectively, be elements, or nodes, in a distributed configuration.

In some implementations, one or more of the computing and communications devices 2300, 2410, 2420, 2510, 2520, 2530 may be a virtual device. For example, the third computing and communications device 2510, the fourth computing and communications device 2520, and the fifth computing and communications device 2520 may, respectively, be virtual devices operating on shared physical resources.

It must be understood that the various components described above with reference to the computing and communications system 2000 are merely examples. Various other components that are neither shown nor described above can be a part of the computing and communications system 2000 and it must be understood that the disclosure provided herein is equally applicable to these other components as well. A few examples of such components can include a data switch, a router, and a bridge. Furthermore, it must be understood that the disclosure provided herein is not limited to a computer network, but is equally applicable to various other networks such as for example, a telecommunication network or a cellular network.

Details pertaining to dynamically modifiable rules as applied to the example computing and communications system 2000 will now be described. Over an initial period of time, the various data handling devices of the computing and communications system 2000 may be configured to use a preliminary set of dynamically modifiable rules that can operate as a framework for an evolution of the set of dynamically modifiable rules in accordance with the disclosure. The use of the preliminary set of dynamically modifiable rules can involve assigning various levels of authority to various types of devices that are a part of the example computing and communications system 2000.

In an example implementation, the various levels of authority may be assigned to the various devices on the basis of a classification structure having a hierarchical format. Accordingly, a first device among a set of devices may be provided a first classification and assigned a higher authority level than a second device among the set of devices that is provided a second classification and assigned a lower authority level.

The classification structure of the various devices can be defined in various ways, stored in one or more databases of one or more computing devices, and made accessible by any of computing devices that are configured to operate in accordance with, the set of dynamically modifiable rules. In an example implementation, the classification structure is defined on the basis of one or more parameters associated with a device, such as, for example, a stand-alone functionality of the device, a network functionality of the device, a volume of data handled by the device, a nature of data being handled by the device, and/or a geolocation of the device in a network. In another example implementation, the classification structure is defined on the basis of features of a device such as, for example, processing power, storage type, hardware modules, device activation date (newer devices are depreciated), device firmware date (devices with older firmware are depreciated), last processing activity date (older activity is depreciated), last network traffic activity date (older activity is depreciated).

Thus, in an example implementation, a functionality of a server may be deemed more important than a functionality of a client device and accordingly, the server may be accorded a first classification and assigned a higher level of authority than the client device that may be accorded a second classification and assigned a lower level of authority than the server.

In another example implementation, a functionality of a database server (such as, for example, the fourth computing and communications device 2510 shown in FIG. 2) that is part of a corporate network (such as, for example, the third network 2500 shown in FIG. 2) may be deemed more functionally critical than a functionality of a web server (such as, for example, the sixth computing and communications device 2530 shown in FIG. 2) and accordingly, the database server may be assigned a higher level of authority than the web server.

In another example implementation, a network functionality of a router (or a data switch) may be deemed more critical to network operability than a network functionality of a modem and accordingly, the router (or data switch) may be accorded a first classification and assigned a higher level of authority than the modem that may be accorded a second classification and assigned a lower level of authority than the router (or data switch).

In another example implementation, a volume of data and/or a nature of data handled by an add drop multiplexer (ADM) may be deemed more valuable monetarily than a volume of data and/or a nature of data handled by a client device and accordingly, the ADM may be accorded a first classification and assigned a higher level of authority than the client device that may be accorded a second classification and assigned a lower level of authority than the ADM.

In another example implementation, a geolocation of a first client device may render the first client device more trustworthy than a different geolocation of a second client device. Accordingly, the first client device may be accorded a first classification and assigned a higher level of authority than the second client device that may be accorded a second classification and assigned a lower level of authority than the first client device.

Figure 3:
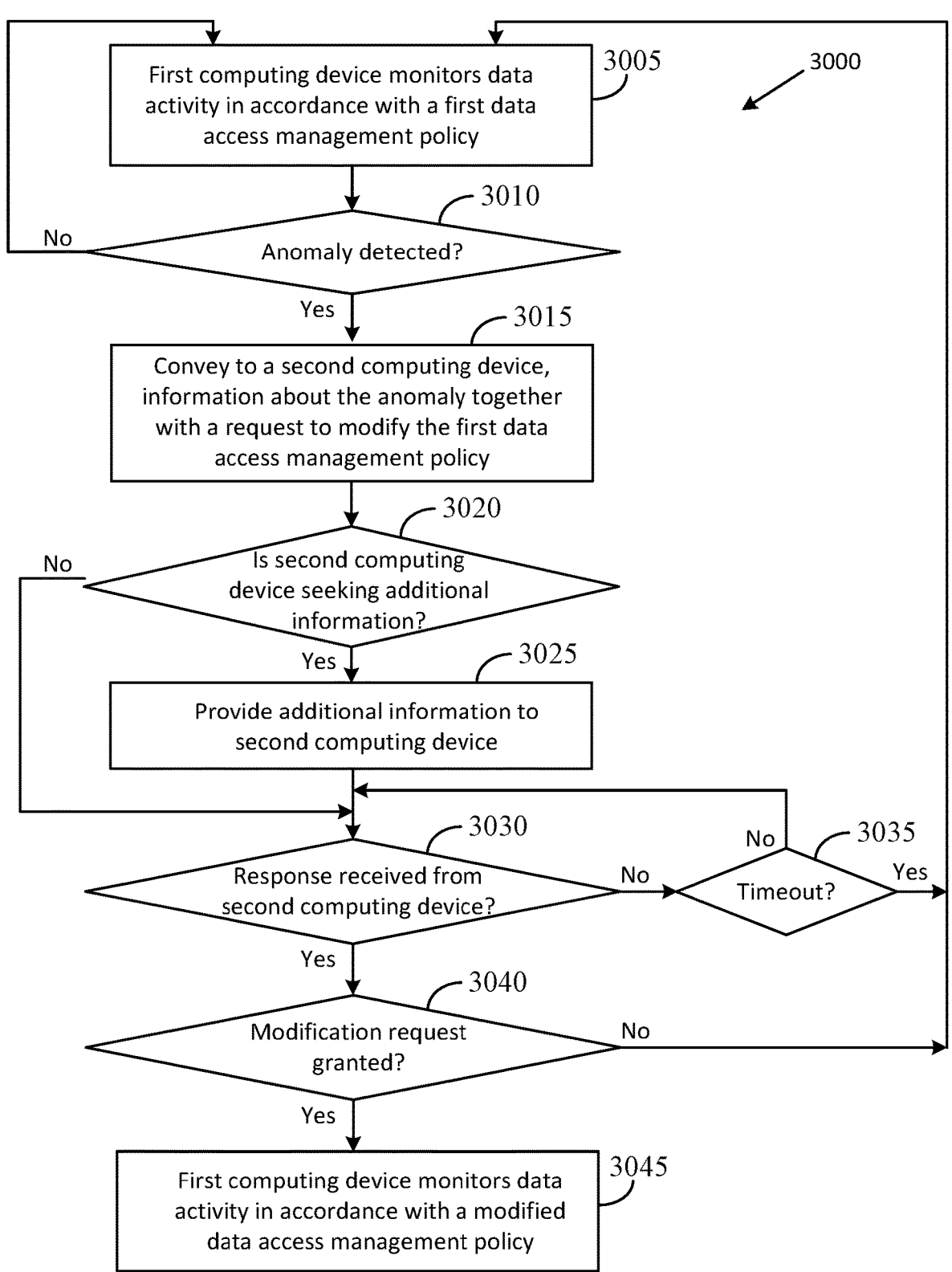
FIG. 3 shows a flowchart of a method by which a computing device makes a request and modifies a dynamically modifiable rule in accordance with the disclosure.

FIG. 3 shows a flowchart 3000 of operations associated with a system employing a dynamically modifiable rules in accordance with the disclosure. The functions shown in the various blocks of the flowchart 3000 may be implemented in whole or in part by a processor. The processor can access a memory that is included in the device. The memory is one example of a non-transitory computer-readable storage medium that stores executable software/firmware and/or executable code that is executable by the processor for implementing the various operations described in the flowchart 3000. Some components of the computing and communications system 2000 are referred to below for purposes of describing various operations of the flowchart 3000. However, it must be understood that at least some of the operations can be executed by various other components of the computing and communications system 2000 and/or by components of various other systems. More particularly, with respect to the description below, one example of what is referred to below as a "first computing device" is the third computing and communications device 2420 shown in FIG. 2 and one example of what is referred to below as a "second computing device" is the fifth computing and communications device 2520 shown in FIG. 2.

At block 3005, a first computing device monitors data activity in accordance with a preliminary set of dynamically modifiable rules that is referred to hereinafter in this description as a first set of dynamically modifiable rules. In this example scenario, the first computing device may monitor data activity on a communications link that is internal to a network and/or may monitor data activity on an inter-network communications link.

The first set of dynamically modifiable rules generally defines operational procedures that can be followed for various purposes. In one example implementation, the first set of dynamically modifiable rules may define operational procedures associated with processing data in accordance with the functionality of the first computing device. For example, the first set of dynamically modifiable rules may define a quality-of-service (QoS) that has to be satisfied by the first computing device when providing data transport services for various customers. Thus, for example, when the data transport services provided by the first computing device is a tiered data transport services arrangement, implementation of the first set of dynamically modifiable rules may be directed at ensuring that a first type of data traffic associated with a first customer is provided a first QoS that is higher than a second QoS provided to a second type of data traffic associated with a second customer.

In another example implementation, the first set of dynamically modifiable rules may define procedures associated with security operations for the first computing device. Accordingly, a processor in the first computing device may execute an anti-virus and/or an antimalware application in accordance with the first set of dynamically modifiable rules to detect a malware attack.

At block 3010, a determination is made whether a data activity that violates the first set of dynamically modifiable rules is detected. The data activity may be detected in the form of an anomaly. If no anomaly is detected, the operations indicated in block 3005 and 3010 are repeated. If anomalous data activity is detected, the operations indicated in block 3015 and subsequent blocks are implemented.

In an example scenario, at block 3010, the anomalous data activity may cause a change in QoS or may appear uncharacteristic enough to be deemed suspicious. In an example scenario, the change in QoS may be manifested in the form of data overflow in a data packet buffer, a reduction in data packet throughput in a communication link, an excessive delay in data packet propagation, excessive loss of data packets, and/or transmission jitter due to data packet congestion. In another example scenario, the change in QoS may be manifested in the form of a received request that has a hitherto unused or an undeterminable protocol, a received request from an unknown or undeterminable port, and/or a change in a protocol connection amount over a time frame (a sliding window operation).

The processor may refer to the first set of dynamically modifiable rules for guidance on how to deal with the anomaly. In one case, the first set of dynamically modifiable rules may provide an indication on how to analyze the data activity and determine if the data activity is harmless or is occurring as a result of malicious activity. The first set of dynamically modifiable rules may, for example, provide security-related guidance on how to detect a code pattern and/or a signature that indicates malicious intent and may also provide information about various malicious code patterns and/or signatures. In another case, the processor may use one or more sets of existing rules to dynamically generate one or more new sets of rules. In an example embodiment, the processor may generate a new set of rules based on applying, for example, machine learning or artificial intelligence, on one or more sets of existing rules. The new set or sets of rules may for example, be applied for malware detection. The dynamic generation of new rules in this manner may be particularly advantageous in dealing with malware that keeps changing, evolving, and transforming at a rapid rate.

However, in some cases, the first set of dynamically modifiable rules may fail to provide adequate guidance such as, for example, when the first computing device is being subjected to a hitherto unknown malware attack.

In this case, at block 3015, the first computing device conveys to a second computing device, information about the detected anomaly together with a request to modify the first set of dynamically modifiable rules. The information about the detected anomaly can include, for example, a description of the anomaly and, if determined, a nature of the anomaly (harmless, malicious, desirable). If the anomaly is harmless, the information may be provided to the second computing device for purposes such as documenting, characterizing and/or informing other computing devices. If the anomaly is malicious, the information may be provided to the second computing device for purposes of seeking to modify the first set of dynamically modifiable rules for anti-malware purposes.

In some cases, the anomaly may occur as a result of occurrence of a desirable activity. In such cases, the information may be provided by the first computing device to the second computing device for purposes of seeking to modify the first set of dynamically modifiable rules in a manner that accommodates and permits the desirable activity in the first computing device as well as in other computing devices. In an example scenario, the detected data activity may be manifested in the form of an increase in data traffic due to introduction of a new service. The new service may have been introduced in either the first computing device or in another computing device that is in communication with the first computing device. In this scenario it is desirable to modify the first set of dynamically modifiable rules for any of various purposes such as, for example, to increase data bandwidth, to categorize the change as a benign change, and/or to notify other computing devices that no anti-malware operations should be taken against this data traffic (such as blocking the data or blacklisting the originating computing device).

In an example implementation in accordance with the disclosure, the second computing device can be a pre-designated computing device and the first computing device conveys the information and the request to the pre-designated computing device.

The second computing device may be pre-designated based on various criteria, such as, for example, based on having a classification and authority level that allows the second computing device to autonomously grant the first computing device permission to modify the first set of dynamically modifiable rules without human intervention.

In another example scenario, the second computing device can be any computing device that is communicatively coupled to the first computing device. In this scenario, the first computing device may send out a broadcast transmission containing the information about the detected anomaly together with the request to modify the first set of dynamically modifiable rules. The broadcast transmission may not necessarily be directed at any specific receiving computing device. Accordingly, any computing device that has a suitable classification and authority level may respond to the broadcast and grant the first computing device permission to modify the first dynamically modifiable first set of dynamically modifiable rules.

At block 3020, the first computing device makes a determination whether the second computing device is seeking additional information from the first computing device. In an example scenario, the second computing device may seek information pertaining to the credentials of the first computing device such as, for example, a classification of the first computing device, a level of authority of the first computing device, a certificate assigned to the first computing device, identification information (MAC address, IP address, etc.), and/or whether the first computing device is configured to operate in accordance with the first set of dynamically modifiable rules.

If the second computing device is seeking additional information, at block 3025, the first computing device provides the additional information to the second computing device.

At block 3030 a determination is made whether a response is received from the second computing device. In one case, no response is received. In this case, the first computing device may operate a timer for purposes of providing a wait time that allows the second computing device time to respond. The wait time can vary under various circumstances and may also be based on an urgency level associated with addressing the anomalous data activity.

At block 3035, a determination is made whether the timer that is configured for providing the wait time has timed out.

If the timer has timed out and no response has been received from the second computing device, the operations indicated in block 3005 and subsequent blocks are carried out. If the timer has not yet timed out, the operations indicated in block 3035 and block 3030 are carried out iteratively.

If, at block 3030, a response is received from the second computing device, at block 3040 a determination is made whether the response from the second computing device indicates a granting of the request to modify the first set of dynamically modifiable rules. If the modification request is denied, no modifications are performed upon the first set of dynamically modifiable rules and the operations indicated in block 3005 and subsequent blocks are carried out.

If the modification request has been approved, at block 3045, the first computing device modifies the first set of dynamically modifiable rules and adopts the modified first set of dynamically modifiable rules. In an example implementation, the second computing device may provide a modified version of the first set of dynamically modifiable rules and, at block 3045, the first computing device will adopt the modified first set of dynamically modifiable rules (rather than performing the modification on its own).

The first computing device and/or the second computing device may then inform one or more other computing devices about the modified first set of dynamically modifiable rules for adoption by the other computing devices. The flowchart 3000 thus enables a system such as, for example, the computing and communications system 2000, to autonomously and flexibly modify a set of dynamically modifiable rules based on operations performed by various computing devices of the system rather than being dependent on human intervention.

Figure 4:
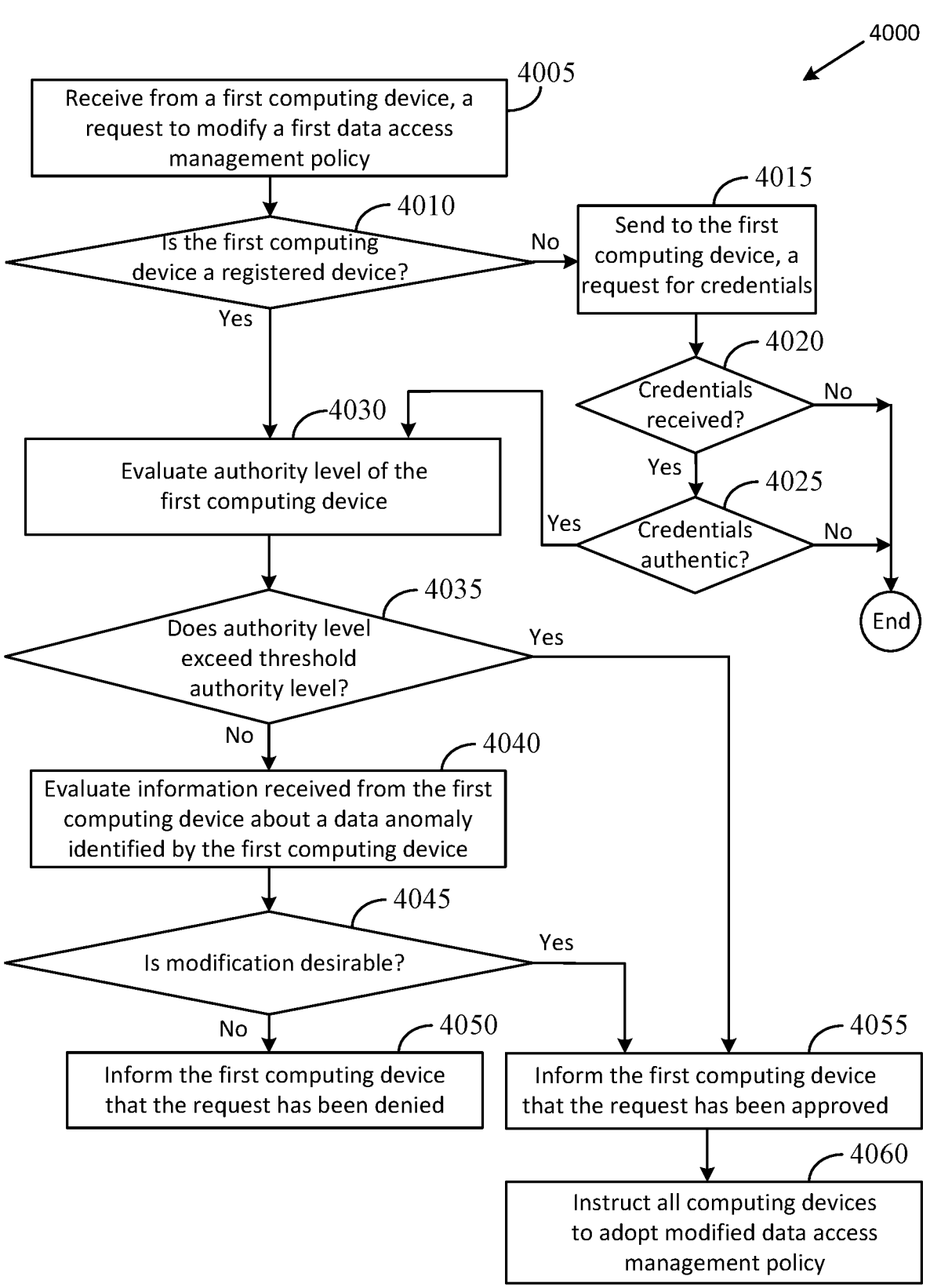
FIG. 4 shows a flowchart of a method by which a computing device receives and responds to a request from another computing device for modifying a dynamically modifiable rule in accordance with the disclosure.

FIG. 4 shows a flowchart 4000 of operations associated with a system employing a set of dynamically modifiable rules in accordance with the disclosure. More particularly, the flowchart 4000 pertains to a method by which a computing device receives and responds to a request from another computing device for modifying a dynamically modifiable rule in accordance with the disclosure. The functions shown in the various blocks of the flowchart 4000 may be implemented in whole or in part by a processor that can be incorporated into a device such as, for example, the second computing device referred to above with respect to the flowchart 3000. As such, the flowchart 4000 can be viewed as an extension of the flowchart 3000 and the description provided below pertains to operations performed by the second computing device with respect to operations performed by the first computing device and described above in the flowchart 3000.

At block 4005, the second computing device receives a request from the first computing device to modify a first set of dynamically modifiable rules. As indicated in block 3015 of flowchart 3000, the request may be accompanied by information about a data activity that violates the first set of dynamically modifiable rules.

At block 4010, the second computing device may make a determination whether the first computing device is a device that is configured to operate in conformance with the dynamically modifiable rules.

If the first computing device is not so configured, at block 4015, the second computing device sends to the first computing device, a request for credentials. Some example credentials can include an authority level of the first computing device, a classification of the first computing device, a certificate assigned to the first computing device, and identification information (MAC address, IP address, etc.)

At block 4020, a determination is made whether credentials have been received from the first computing device. In an example scenario, no credentials may be received. If so, further actions by the second computing device are ended. In another example scenario, credentials may be received. If so, at block 4025, a determination is made whether the credentials are authentic. If the received credentials are fraudulent, further actions by the second computing device are ended. In an example scenario, the received credentials may be deemed fraudulent for any of various reasons, such as, for example, because the first computing device is included in a blacklist, because the first computing device is located in a facility that is untrustworthy, and/or because the received credentials include suspicious content.

If, at block 4025, it is determined that the received credentials are authentic, at block 4030, the second computing device identifies a level of authority of the first computing device. Information pertaining to the classification and level of authority may be stored in a database of the first computing device and/or in a database of the second computing device.

At block 4035, the second computing device determines whether the level of authority of the first computing device exceeds a threshold authority level. The threshold authority level can be a designated level of authority that may be preset by a system administrator, for example.

In an example implementation, the various levels of authority may be assigned to various devices of a network on the basis of a classification structure having a hierarchical format. Accordingly, a first device among a set of devices may be provided a first classification and assigned a higher authority level than a second device among the set of devices that is provided a second classification and assigned a lower authority level.

Thus, in an example scenario, at block 4035, the second computing device determines that the level of authority of the first computing device exceeds the threshold authority level. In this scenario, the first computing device is authorized to perform modifications upon the first set of dynamically modifiable rules without approval from computing devices having a lower level of authority. Accordingly, the first computing device may merely be informing the second computing device about a modification of the first set of dynamically modifiable rules and may seek an approval from the second computing device merely as a formality in a non-binding manner.

In the illustrated example, upon determining, at block 4035 that the second computing device exceeds the threshold authority level, at block 4055, the second computing device informs the first computing device that the request has been approved. A modified set of dynamically modifiable rules may be then generated by the first computing device and/or by the second computing device.

At block 4060, the second computing device may inform and instruct one or more computing devices of the network to adopt the modified set of dynamically modifiable rules.

In another example scenario, at block 4035, the second computing device determines that the level of authority of the first computing device does not exceed the threshold level of authority. In this scenario, at block 4040, the second computing device evaluates information provided by the first computing device. The information can include details about a data activity that is an anomaly and violates the first set of dynamically modifiable rules. The information can be accompanied by a request and/or a recommendation to modify the first set of dynamically modifiable rules.

The information about the detected anomaly can include, for example, a description of the anomaly and, if determined, a nature of the anomaly (harmless, malicious, desirable). If the anomaly is harmless, the information may be provided to the second computing device for purposes such as documenting, characterizing and/or informing other computing devices. If the anomaly is malicious, the information may be provided to the second computing device for purposes of seeking to modify the first set of dynamically modifiable rules for anti-malware purposes.

In some cases, the anomaly may occur as a result of occurrence of a desirable activity. In such cases, the information may be provided by the first computing device to the second computing device for purposes of seeking to modify the first set of dynamically modifiable rules in a manner that accommodates and permits the desirable activity in the first computing device as well as in other computing devices. Some additional details pertaining to this matter are provided above.

At block 4045 a determination is made whether the modification is desirable. In an example scenario, the modification is desirable for one or more reasons such as, for example, the modification is advantageous to multiple computing devices in the network and may improve operations of the network. If so, at block 4055, the second computing device informs the first computing device that the request has been approved.

A modified set of dynamically modifiable rules may be then generated by the first computing device and/or the second computing device for use by the first computing device. At block 4060, the second computing device may inform and instruct one or more other computing devices of the network to adopt a modified set of dynamically modifiable rules.

In another example scenario, at block 4045, it may be determined that the modification is not desirable for one or more reasons such as, for example, the modification is applicable only to the first computing device and/or may adversely affect one or more other computing devices in the network. In this scenario, at block 4050, the second computing device informs the first computing device that the request has been denied and instructs the first computing device to continue operating in accordance with the first set of dynamically modifiable rules.

Figure 5:
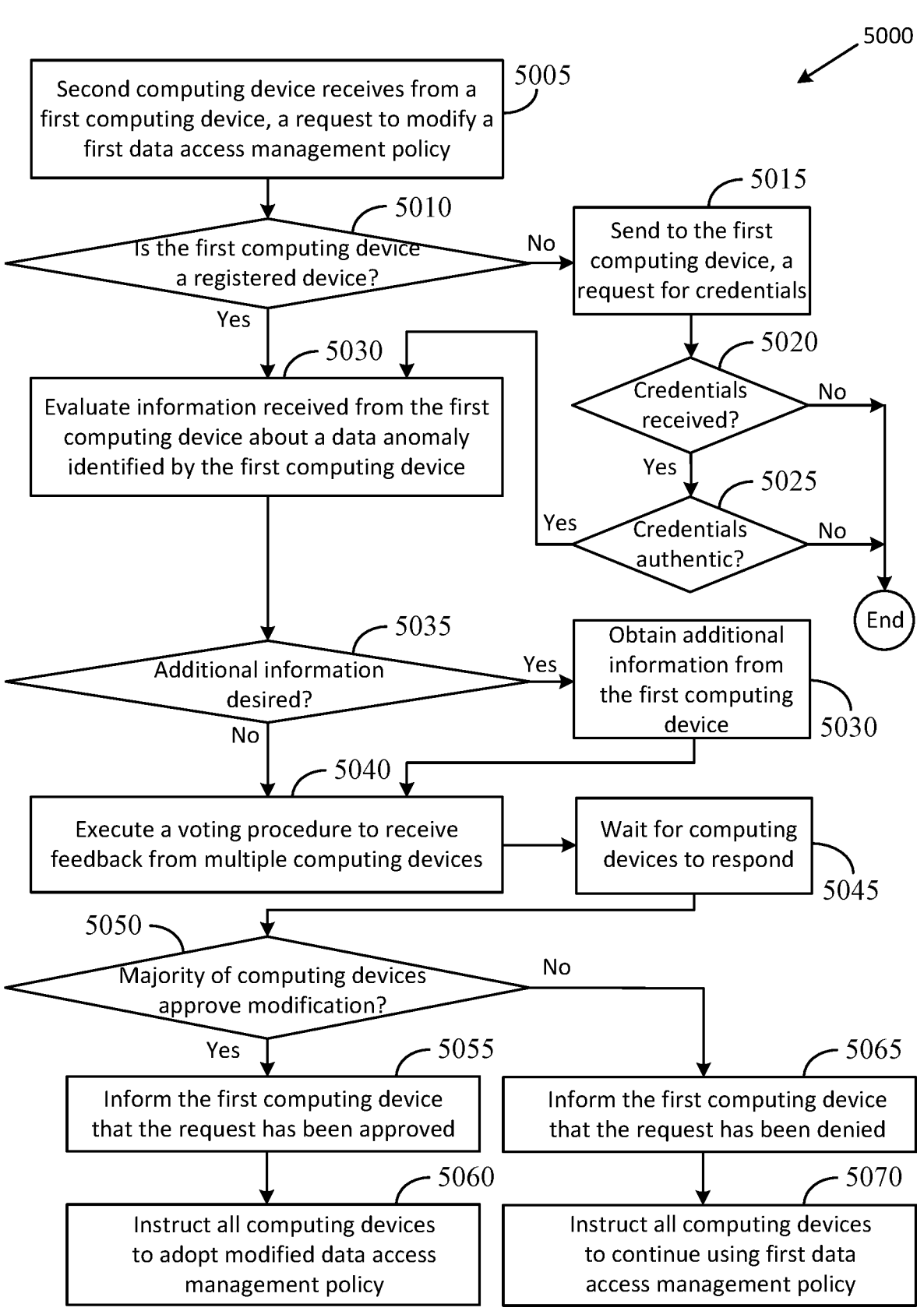
FIG. 5 shows a flowchart of another method by which a computing device receives and responds to a request from another computing device for modifying a dynamically modifiable rule in accordance with the disclosure.

FIG. 5 shows a flowchart 5000 of operations associated with a system employing a set of dynamically modifiable rules in accordance with the disclosure. More particularly, the flowchart 5000 pertains to another method by which a computing device receives and responds to a request from another computing device for modifying a dynamically modifiable rule in accordance with the disclosure. The functions shown in the various blocks of the flowchart 5000 may be implemented in whole or in part by a processor that can be incorporated into a device such as, for example, the second computing device referred to above with respect to the flowchart 3000. As such, the flowchart 5000 can be viewed as an extension of the flowchart 3000 and the description provided below pertains to operations performed by the second computing device with respect to operations performed by the first computing device and described above in the flowchart 3000.

At block 5005, the second computing device receives, from a first computing device, a request to modify a first set of dynamically modifiable rules. As indicated in block 3015 of flowchart 3000, the request may be accompanied by information about a data activity that violates the first set of dynamically modifiable rules.

At block 5010, the second computing device may make a determination whether the first computing device is a device that is configured to operate in conformance with the first set of dynamically modifiable rules.

If the first computing device is not so configured, at block 5015, the second computing device sends to the first computing device, a request for credentials. Some example credentials can include an authority level of the first computing device, a classification of the first computing device, a certificate assigned to the first computing device, and identification information (MAC address, IP address, etc.)

At block 5020, a determination is made whether credentials have been received from the first computing device. In an example scenario, no credentials are received. If so, further actions by the second computing device are ended. In another example scenario, credentials are received. If so, at block 5025, a determination is made whether the credentials are authentic. If the received credentials are not authentic, further actions by the second computing device are ended.

If the received credentials are authentic, at block 5030, the second computing device evaluates information provided by the first computing device. The information can include details about a data activity that is an anomaly and violates the first set of dynamically modifiable rules. The information can be accompanied by a request and/or a recommendation to modify the first set of dynamically modifiable rules. The information about the detected anomaly can include, for example, a description of the anomaly and a nature of the anomaly (harmless, malicious, desirable). If the anomaly is harmless, the information may be provided to the second computing device for purposes such as documenting, characterizing and/or informing other computing devices. If the anomaly is malicious, the information may be provided to the second computing device for purposes of seeking to modify the first set of dynamically modifiable rules for anti-malware purposes.

In some cases, the anomaly may occur as a result of occurrence of a desirable activity. In such cases, the information may be provided by the first computing device to the second computing device for purposes of seeking to modify the first set of dynamically modifiable rules in a manner that accommodates and permits the desirable activity in the first computing device as well as in other computing devices. Some additional details pertaining to this matter are provided above.

At block 5035, the second computing device may decide if additional information is needed from the first computing device. In an example scenario, the second computing device may seek information pertaining to the credentials of the first computing device such as, for example, whether the first computing device is configured to operate in conformance with the first set of dynamically modifiable rules, a classification of the first computing device, a level of authority of the first computing device, a certificate assigned to the first computing device, and identification information (MAC address, IP address, etc.).

At block 5030, the first computing device may provide additional information. The second computing device may evaluate the additional information, particularly, to determine whether the level of authority of the first computing device is below a threshold authority level. The threshold authority level can be a designated level of authority that may be preset by a system administrator, for example.

In one case, the level of authority of the first computing device is above the threshold authority level and the second computing device may seek approval of the first computing device before proceeding to the next operation indicated in block 5040. In another case, the level of authority of the first computing device is below the threshold authority level and the second computing device proceeds to the next operation indicated in block 5040.

At block 5040, a voting procedure is initiated by the second computing device to obtain feedback from multiple computing devices about modifying the first set of dynamically modifiable rules. Each of the multiple computing devices is a participant of the first set of dynamically modifiable rules. In an example implementation of the voting procedure, each computing device in a subset of a set of computing devices (such as the computing devices of the computing and communications system 2000) is invited to submit votes to the second computing device. The subset of computing devices may be identified and selected in various ways. In an example implementation, each computing device in the subset of computing devices is identified and selected on the basis of having an authority level that exceeds the threshold authority level.

At block 5045, the second computing device waits for the multiple computing devices to respond. In an example implementation, this operation may be carried out by use of a timer to execute a waiting period. When the waiting period has expired, at block 5050, the second computing device makes a determination whether a majority of computing devices approve a modification of the first set of dynamically modifiable rules.

If the majority of computing devices disapprove a modification of the first set of dynamically modifiable rules, at block 5065, the second computing device informs the first computing device that the request for modifying the first set of dynamically modifiable rules is denied. The first computing device may be instructed to continue operating in accordance with the first set of dynamically modifiable rules.

At block 5070, the second computing device may also inform and instruct one or more other computing devices of the network to continue operating in accordance with the first set of dynamically modifiable rules (without modification).

If at block 5050 it is determined that the majority of computing devices approve a modification of the first set of dynamically modifiable rules, at block 5055, the first computing device is informed that the request for modifying the first set of dynamically modifiable rules is approved. The first computing device may be instructed to operate in conformance with a modified set of dynamically modifiable rules that may be generated by the first computing device and/or the second computing device.

At block 5060, the second computing device may inform and instruct one or more other computing devices of the network to adopt the modified set of dynamically modifiable rules.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like.

Implementations or portions of implementations of the above disclosure can take the form of a computing device program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device, a solid-state drive, a memory card, removable media, a read-only memory (ROM), a random-access memory (RAM), any type of disk including a hard disk, a floppy disk, an optical disk, a magnetic or optical card, an application-specific integrated circuits (ASICs), or another type of non-transitory media suitable for storing electronic data, or a combination thereof. The computer-usable or computer-readable medium may include non-volatile memory, such as a disk drive, or another form of non-volatile memory capable of persistent electronic data storage, such as in the absence of an active power supply. The computer-usable or computer-readable medium may include, or may be implemented as, one or more physical or logical units.

Computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

Unless expressly stated, or otherwise clear from context, the terminology "computing device," and variations or wordforms thereof, such as "computer," "computing machine," "computing and communications device," and "computing unit," indicates a "computing device," such as the computing device 1000 shown in FIG. 1, that implements, executes, or performs one or more aspects of the methods and techniques described herein, or is represented by data stored, processed, used, or communicated in accordance with the implementation, execution, or performance of one or more aspects of the methods and techniques described herein.

The word "example" as used herein is intended to be non-exclusionary and non-limiting in nature. One of ordinary skill in the art will understand the principles described herein and recognize that these principles can be applied to a wide variety of applications and situations, using a wide variety of tools, processes, and physical elements. Words such as "implementation," "scenario," "case," "approach," and "situation" must be interpreted in a broad context, and it must be understood that each such word represents an abbreviated version of the phrase "In an example "xxx" in accordance with the disclosure" (where "xxx" corresponds to "implementation," "scenario," "case," "approach," "situation" etc.).

Unless expressly stated, or otherwise clear from context, the terminology "determine," "identify," and "obtain," and variations or wordforms thereof, indicates selecting, ascertaining, computing, looking up, receiving, determining, establishing, obtaining, or otherwise identifying or determining using one or more of the devices and methods shown and described herein. Unless expressly stated, or otherwise clear from context, the terminology "example," and variations or wordforms thereof, such as "embodiment" and "implementation," indicates a distinct, tangible, physical realization of one or more aspects, features, or elements of the devices, methods, and techniques described herein. Unless expressly stated, or otherwise clear from context, the examples described herein may be independent or may be combined.

Unless expressly stated, or otherwise clear from context, the terminology "or" is used herein inclusively (inclusive disjunction), rather than exclusively (exclusive disjunction). For example, unless expressly stated, or otherwise clear from context, the phrase "includes A or B" indicates the inclusion of "A," the inclusion of "B," or the inclusion of "A and B." Unless expressly stated, or otherwise clear from context, the terminology "a," or "an," is used herein to express singular or plural form. For example, the phrase "an apparatus" may indicate one apparatus or may indicate multiple apparatuses. Unless expressly stated, or otherwise clear from context, the terminology "including," "comprising," "containing," or "characterized by," is inclusive or open-ended such that some implementations or embodiments may be limited to the expressly recited or described aspects or elements, and some implementations or embodiments may include elements or aspects that are not expressly recited or described.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:

applying, by a first computing device, a first set of dynamically modifiable rules for operating upon data, wherein the first set of dynamically modifiable rules are included in the first computing device;

detecting, by the first computing device, a data activity that violates the first set of dynamically modifiable rules; and conveying, by the first computing device, to a second computing device, based on detecting the data activity that violates the first set of dynamically modifiable rules, a request to grant the first computing device an approval to modify the first set of dynamically modifiable rules that are included in the first computing device, wherein detecting the data activity that violated the first set of dynamically modifiable rules comprises detecting at least one of malicious data packets received from a third computing device, anomalous network traffic patterns from the third computing device, or unauthorized attempts by the third computing device to modify security configurations of the first computing device, and wherein the third computing device is different from the first computing device and from the second computing device.

2. The method of claim 1, further comprising:

receiving, by the first computing device, from the second computing device, an approval to modify the first set of dynamically modifiable rules; and applying, by the first computing device, based upon the approval received from the second computing device, a second set of dynamically modifiable rules that is a modified version of the first set of dynamically modifiable rules.

3. The method of claim 2, wherein the second set of dynamically modifiable rules includes a blacklisting of the third computing device and applying of an anti-malware procedure upon data received from the third computing device by the first computing device and at least a fourth computing device.

4. The method of claim 2, further comprising:

receiving, by a fourth computing device, from at least one of the first computing device or the second computing device, details associated with the second set of dynamically modifiable rules; and applying, by the fourth computing device, the second set of dynamically modifiable rules.

5. The method of claim 2, wherein the first computing device is assigned a first authority level and the second computing device is assigned a second authority level that is higher than the first authority level, the second authority level granting the second computing device an authority to autonomously grant permission to modify the first set of dynamically modifiable rules without human intervention.

6. The method of claim 5, wherein the first authority level is based, at least in part, on a first functionality executed by the first computing device and the second authority level is based, at least in part, on a second functionality executed by the second computing device.

7. The method of claim 5, wherein at least one of the first authority level or the second authority level is assigned by a human operator.

8. A method comprising:

receiving, by a first computing device, from a second computing device, a request to grant the second computing device a permission to modify a first set of dynamically modifiable rules, wherein the first set of dynamically modifiable rules is included in the second computing device and is applicable to the second computing device for operating upon data, the request containing information about a data activity that violates the first set of dynamically modifiable rules, wherein the data activity comprises malicious data packets received from a third computing device, anomalous network traffic patterns from the third computing device, or unauthorized attempts by the third computing device to modify security configurations of the first computing device, and wherein the third computing device is different from the first computing device and from the second computing device;

evaluating, by the first computing device, the request received from the second computing device, wherein the evaluation is based on criteria including a severity of the violation; and one of modifying or retaining the first set of dynamically modifiable rules, based at least in part, on evaluating the request received from the second computing device.

9. The method of claim 8, further comprising:

conveying, by the first computing device, to at least the second computing device, based on the one of modifying or retaining the first set of dynamically modifiable rules, one of an approval or a denial of the request received from the second computing device.

10. The method of claim 8, wherein the one of modifying or retaining the first set of dynamically modifiable rules is further based on evaluating an authority level assigned to the second computing device.

11. The method of claim 8, wherein the one of modifying or retaining the first set of dynamically modifiable rules is further based on evaluating information received from at least the third computing device about the data activity.

12. The method of claim 11, wherein the one of modifying or retaining the first set of dynamically modifiable rules is further based on a voting procedure involving a set of computing devices that are communicatively coupled to each other via a network, the set of computing devices including the first computing device and the second computing device.

13. The method of claim 12, wherein a second set of dynamically modifiable rules that is a modified version of the first set of dynamically modifiable rules is made applicable to at least the first computing device, the second computing device, and the third computing device.

14. A system comprising:

a first computing device comprising:

a first non-transitory computer-readable storage medium; and a first processor configured to execute instructions stored in the first non-transitory computer-readable storage medium to at least:

receive, from a second computing device, a request to grant the second computing device a permission to modify a first set of dynamically modifiable rules, wherein the first set of dynamically modifiable rules is included in the second computing device and is applicable to the first computing device for operating upon data, the request including information about a data activity that violates the first set of dynamically modifiable rules wherein the data activity comprises malicious data packets received from a third computing device, anomalous network traffic patterns from the third computing device, or unauthorized attempts by the third computing device to modify security configurations of the first computing device, and wherein the third computing device is different from the first computing device and from the second computing device;

evaluate the request received from the second computing device; and one of modify or retain the first set of dynamically modifiable rules, based at least in part, on evaluating the request received from the second computing device.

15. The system of claim 14, wherein the first computing device is assigned a first authority level and the second computing device is assigned a second authority level that is lower than the first authority level, the first authority level granting the first computing device an authority to autonomously grant permission to modify the first set of dynamically modifiable rules without human intervention.

16. The system of claim 15, wherein the second authority level assigned to the second computing device configures the second computing device to disallow autonomous modifying of the first set of dynamically modifiable rules.

17. The system of claim 14, wherein the first computing device and the second computing device are elements of a set of computing devices that are communicatively coupled to each other via a network, and wherein the first processor in the first computing device is further configured to execute instructions stored in the first non-transitory computer-readable storage medium to:

execute a voting procedure, the voting procedure directed at obtaining a consensus from the set of computing devices on one of modifying or retaining the first set of dynamically modifiable rules based on the information about the data activity provided by the second computing device to the first computing device; and utilize a result of the voting procedure to one of modify or retain the first set of dynamically modifiable rules.

18. The system of claim 17, wherein the first processor in the first computing device is further configured to execute instructions stored in the first non-transitory computer-readable storage medium to:

implement, as a part of the voting procedure, a hold time that is selected to permit at least a subset of the set of computing devices to submit votes to the first computing device.

19. The system of claim 18, wherein each of the subset of computing devices has an individual authority level that exceeds a threshold authority level.

* * * * *